United States Patent [19]

Gaylord et al.

[11] Patent Number: 5,173,921

[45] Date of Patent: Dec. 22, 1992

[54] APPARATUS AND PROCESS FOR ACTIVATION OF CARBON BY ELECTRICAL RESISTANCE HEATING IN THE PRESENCE OF STEAM

[76] Inventors: E. Mervyn J. Gaylord, Plot 19, Third Rd., Golden Harvest, Randburg, Transvaal; Cornelius J. du Plessis, 82 Zebrena Crescent, Nelspruit, 1200 Transvaal, both of South Africa

[21] Appl. No.: 785,535

[22] Filed: Oct. 31, 1991

Related U.S. Application Data

[62] Division of Ser. No. 637,549, Jan. 4, 1991, Pat. No. 5,089,457.

[51] Int. Cl.⁵ .............................................. F27D 3/00
[52] U.S. Cl. .................................. 373/115; 373/109; 373/110; 373/111; 373/113; 373/114; 373/115; 373/117; 373/118; 201/19; 201/27; 202/134; 202/136; 423/445; 423/449.1; 502/5; 502/55; 502/432
[58] Field of Search .................. 373/115, 109–114, 373/116–120; 502/5, 45, 432, 436; 201/19, 27; 202/134, 136, 118, 119; 423/449, 445, 460

[56] References Cited

U.S. PATENT DOCUMENTS

| | | | |
|---|---|---|---|
| 935,344 | 9/1909 | White | 373/120 |
| 1,593,879 | 7/1926 | Naugle | 373/116 |
| 1,597,208 | 8/1926 | Naugle | 373/115 |
| 1,601,222 | 9/1926 | Naugle | 373/116 |
| 1,634,477 | 7/1927 | Wickenden et al. | 373/119 |
| 1,686,100 | 10/1928 | Okell et al. | 373/115 |
| 2,488,398 | 11/1949 | Handwerk et al. | 373/120 |
| 2,931,719 | 4/1960 | Menegoz et al. | 373/120 |
| 4,082,543 | 4/1978 | Beggs et al. | 373/120 |
| 4,261,857 | 4/1981 | Nakao | 373/120 |
| 5,089,457 | 2/1992 | Gaylard et al. | 502/5 |

Primary Examiner—Bruce A. Reynolds
Assistant Examiner—Tu Hoang

[57] ABSTRACT

In an apparatus and process for the activation of carbon from carbon feedstocks by electrical resistance heating in the presence of steam, which comprises preheating particles of the carbon feedstock in a preheater, having the particles descend by gravity into and through a vertical reactor connected to the preheater, introducing steam at the bottom of the reactor so that it moves upward against the downward flow of the particles, passing an electric current through the particles in the reactor, and discharging the activated carbon from the bottom of the reactor, the improvements that comprise feeding the carbon feedstock through the side of the preheater, controlling the electric input, having the reactor project into the preheater, using a knife-gate valve and a discharge-limiting device to control the discharge of the activated carbon, using a carbon feedstock that contains up to about 25% of organic volatiles, maintaining the preheating temperature within a range from about 550° C. to about 750° C., having the inner radius of the reactor about 75 times the average size of the particles, and having the electric current pass through a portion of the particles in the preheater.

1 Claim, 1 Drawing Sheet

APPARATUS AND PROCESS FOR ACTIVATION OF CARBON BY ELECTRICAL RESISTANCE HEATING IN THE PRESENCE OF STEAM

This application is a divisional application of patent Ser. No. 07/637,549, filed Jan. 4, 1991, now U.S. Pat. No. 5,089,457.

This invention relates to the manufacture of activated carbon from a carbonaceous substance by electrical resistance heating in the presence of steam. It particularly relates to an improved apparatus for carrying out an electrical resistance heating process in which the energy cost of activation is reduced, the material yield of product is greater, the product is more uniform, and the pollutant emissions to the atmosphere are lowered as compared with previously described electrical resistance processes for the activation of carbon.

BACKGROUND OF THE INVENTION

The activation of carbon is an old process that has been carried out in many ways. In all the varieties of activation processes now in use the carbon feedstock is a carbonaceous substance from which volatile matter has been substantially removed by heating in the absence of air (charring or carbonization), or from which volatile matter is naturally substantially absent. Examples of the former category are coconut char, wood char "charcoal"), and bituminous coke. An example of the latter category is anthracite coal of sufficiently low volatile content. The activation is effected by a gasification process that creates a greatly enlarged surface area and an extensive network of submicroscopic pores. The most common gasification processes are:

$$C_{solid} + H_2O_{gas} \rightarrow CO_{gas} + H_{2gas}$$

$$C_{solid} + CO_{2gas} \rightarrow 2CO_{gas}$$

These processes require high temperatures (generally above about 700° C.) and are endothermic, and are therefore energy-intensive.

The necessary energy can be supplied from a combustion source, and transferred to the carbon by the superheated steam or carbon dioxide that passes through it, or it can be supplied directly to the carbon by making use of its electrical resistivity. The use of electrical resistance heating offers the advantage of supplying the energy directly to the carbon where it is needed, and there have been various attempts to develop such a process on a practical scale, as described, for example, in U.S. Pat. Nos. 1,634,477, 1,634,478, 1,634,480, 1,686,100, 1,854,387, 1,593,879, 1,597,208, 1,601,222, 1,701,272, 2,003,278, and 2,270,245. However, there have been many difficulties which have impeded or prevented the successful commercial application of electrical resistance heating for manufacture of activated carbon. These difficulties have involved variations of electrical resistivity of the carbons as a function of their source, of their content of volatiles, of temperature, and of other factors. Another difficulty has been the uneven distribution of steam through the carbon granules. The resulting activated carbons have consequently been nonuniform in their properties from batch to batch as well as within each batch. Attempts to bring all parts of a batch of carbon to the desired degree of activation have led to higher energy costs and lower material yields. Attempts to circumvent these difficulties have led to various stratagems such as fluidization of the carbon, or the use of moving parts, in some cases including the electrodes themselves, as exemplified in U.S. Pat. Nos. 1,686,100, 1,593,879, and 1,601,222. We have found that fluidization leads to arcing of electricity between particles and to nonuniform properties. Mechanical actions damage the carbon granules or pellets and reduce the material yield, and necessarily involve higher capital and maintenance costs for the equipment.

THE PRESENT INVENTION

It is accordingly an object of this invention to provide an improved apparatus and process for the activation of carbon by electrical resistance heating in the presence of an activating gas.

It is another object of this invention to provide such improvement when the activating gas is steam.

It is another object of this invention to provide such improvement when the carbon feedstock contains up to about 25% of volatile organic matter and to convert much of this volatile matter into product, thereby realizing an enhanced material yield of activated carbon.

It is another object of this invention to provide a process in which 2 kg or less of steam is utilized per 1.4 to 1.8 kg of the carbon feedstock. This amounts to using about 2 kg of steam per kg of finished product.

It is another object of this invention to provide a product that is uniform in its properties, and to be able to maintain such uniformity from batch to batch.

Since activated carbon that has been substantially exhausted (spent) in service as a purification medium for removal of pollutants from liquids or from air or other gases typically contains less than about 25% of its dry weight of volatile organic matter, and since the conversion of such spent carbon to activated carbon is commonly referred to as reactivation, it is another object of this invention to provide such improvement for the reactivation of spent carbon. Accordingly, the carbon feedstock can be spent carbon.

It is yet another object of this invention to reduce the release of pollutant gases from the activation process, and further to eliminate the discharge to the atmosphere of any such pollutant gases.

Other objects will appear in the description that follows.

BRIEF DESCRIPTION OF THE DRAWING

The drawing shows an apparatus for the activation of carbon by electrical resistance in the presence of activating gas.

In accordance with this invention there are provided improvements in the process and apparatus for the activation of carbon by electrical resistance heating in the presence of steam. The improvements are set forth below:

Figure 1:
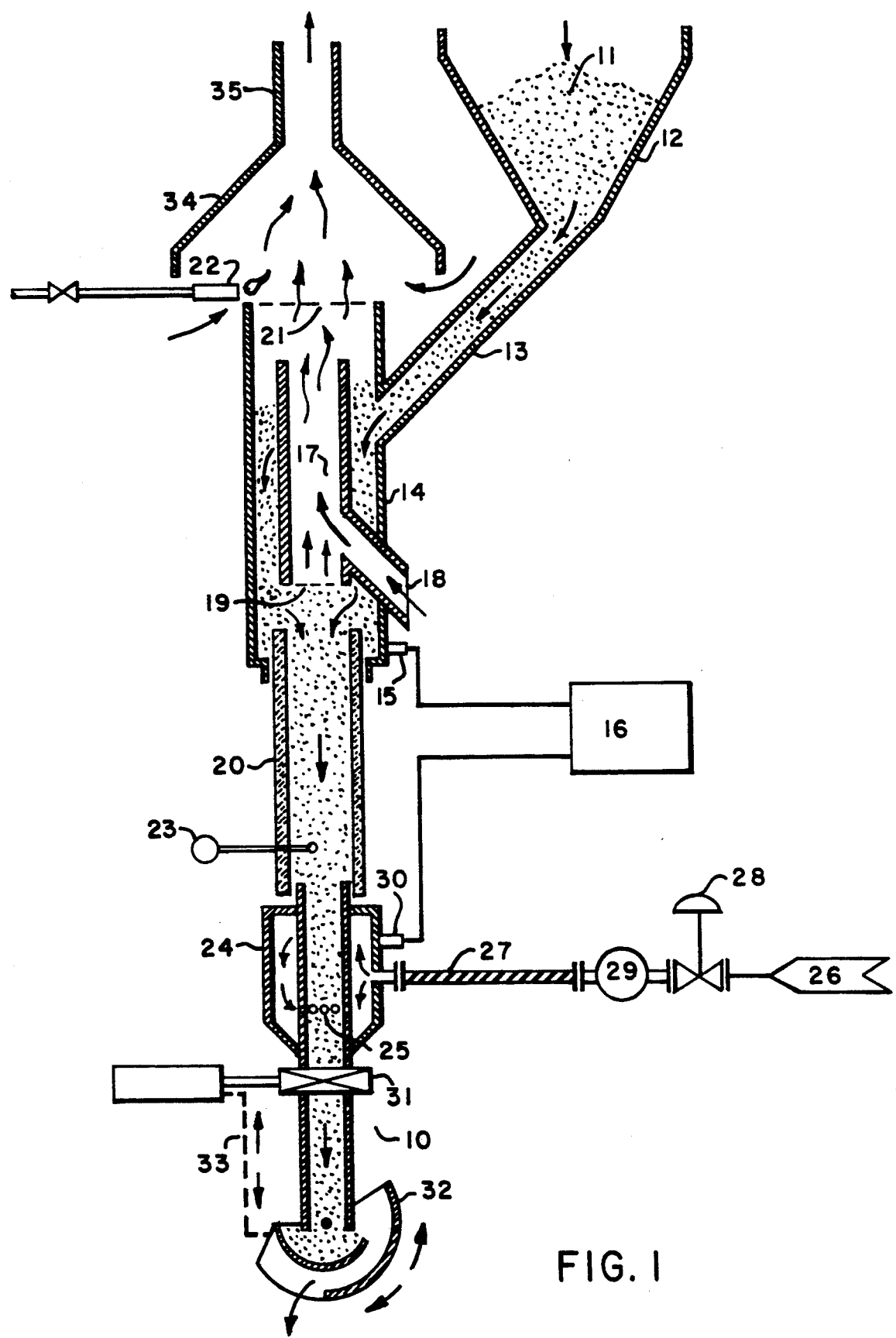

(a) In an apparatus that comprises a feed hopper from which the carbon feedstock enters via a feed chute into a preheating vessel which includes a gas combustion chamber where gases released from the reaction vessel are burned, the preheating vessel being constructed of stainless steel, a vertical tubular reactor of refractory material, whose top is joined to the bottom of the preheating vessel and whose bottom is joined to a metallic steam-jacketed cylindrical vessel, means for introducing steam from the steam-jacketed vessel into the inside of the vessel, the steam passing upward through the tubular reactor, an electrode on the outside of the preheating vessel and another electrode on the outside of the steam-jacketed vessel, the electrodes being connected to a source of electric current, the current passing between the electrodes through the descending carbon particles, a flue positioned above the preheating vessel and gas combustion chamber to remove spent gases, temperature measuring means inside the tubular reactor, and means for releasing the activated carbon at the end of the process, the improvements wherein the carbon feedstock is fed into the preheating vessel from the side so that it maintains a constant level therein, the current is controlled from a temperature signal by means of a current-limiting device, the top end of the tubular reactor projects into the preheating vessel, and the means for releasing the activated carbon is a knife-gate valve and a discharge-limiting device.

(b) In a process for activation of carbon from carbon feedstocks by electrical resistance heating in the presence of steam, wherein the carbon feedstock is preheated before activation; the combustible gases exiting from the preheating vessel are ignited by a pilot burner; the carbon flows downward by gravity through a reaction vessel in which the activation of the carbon takes place; an electric current is passed through the carbon in the reaction vessel; steam is passed into and flows upward through said reaction vessel; and the activated carbon product is discharged from the bottom of the reaction vessel, the improvement that comprises the use of a carbon feedstock that contains up to about 25% of volatile organic matter; the maintenance of the preheating temperature within the range of 550° C. to 750° C. to achieve the lowest electrical resistivity of the carbon; the inclusion in the electric circuit of a portion of the carbon in the preheating vessel that just surrounds the uppermost part of the reaction vessel; the use of a cylindrical reaction vessel whose inner radius is no more than 75 times that of the size-average of the largest dimensions of the carbon feedstock particles, wherein the size-average, $L_s = \Sigma L^2 / \Sigma L$, where L is the largest dimension of any given particle.

The carbon feedstock, which consists of particles, may be obtained by the carbonization of wood, coconut or other nut shells, bituminous coal, or other suitable carbonaceous source material. It may contain from zero up to as much as about 25 percent or even more of volatile organic matter. If the carbonaceous source material, such as anthracite coal, initially contains less than about 25% of volatile organic matter, the preliminary carbonization step may be omitted. The individual particles may range from about 1 to about 7 mm in their largest dimension, although these are not absolute limitations. We have found that particles smaller than about 1 mm tend to restrict steam flow through the bed, while particles larger than about 7 mm are generally less well activated than particles in the aforesaid preferred size range.

The carbon feedstock is fed into a preheating vessel from the side so that it maintains a constant level therein. This control has the effect of maintaining a constant steam pressure drop through the system and thus a controlled steam flow and activation rate, and it also prevents condensation of excess steam onto the feedstock, which would occur of the gases were to pass through the feed hopper. The preheating vessel serves as one of the electrodes for the passage of electricity through the carbon.

The carbon feedstock is then preheated to a temperature preferably in the range of from about 600° C. to about 700° C., which is optimal for lowering its electrical resistivity. Alternatively, the temperature may be as low as 550° C. or as high as 750° C., and still serve to maintain an acceptably low electrical resistance. The energy for the preheating is provided in part by the hot gases emanating from the activation process, and in part by the conductance of electricity through the portion of the carbon just prior to its entry into the activation zone. In another embodiment of our invention, an additional source of heat may be provided by the combustion of the hot gases emanating from the activation process. This combustion is spontaneous and is regulated by controlling the air inlet into a gas combustion chamber to achieve the optimal temperature and, if needed, the removal of moisture from the carbon feedstock. An important benefit of this preheating feature, with or without the modified arrangement that embodies the gas combustion chamber, is that volatile matter released from the lower portion of the preheated carbon is not discharged from the system, but instead rises and condenses on the cooler portion of the carbon that moves down to meet it. This aspect of our invention contributes to the ability of our process to activate a carbon feedstock that contains up to about 25% of volatile organic matter, and to convert much of this matter to product.

The carbon passes downward by gravity through a reaction vessel, where the temperature is maintained at the level required for the activation process, which is preferably in the range of about 800° to 900° C. This maintenance is provided by accurate control of the electrical power input, which may in turn be regulated by a semiconductor rectifier device such as a thyristor that responds to a signal from a thermometer suitably located in the reactor. Below the reaction vessel is a combined steam distributor, steam heater, and electrode. This feature provides uniform distribution of steam through the carbon, and at the same time serves as a heat exchanger by allowing transfer of heat from the hot steam heater and activated carbon to the incoming steam. In this way the steam heater is kept below the temperature at which material damage would occur and the steam is preheated to the necessary reaction temperature. The amount of steam utilized is about 2 to 3 kg per kg of dry feedstock, which comes to about 1.4 to 1.8 kg per kg of product. At the same time, the carbon is cooled below its ignition temperature (which is, for example, about 460° C. for a bituminous coal-based activated carbon) so that there is no danger of its combustion when it is discharged and exposed to the atmosphere.

The activated and partially cooled carbon is released intermittently through a knife gate valve provided with a discharge-limiting device. This combination lets the carbon be released by gravity without allowing significant steam leakage. It adds to the overall effectiveness of our invention by conserving energy and minimizing wear of equipment. For example, a rotary valve would allow more steam leakage and would be subject to more rapid wear.

The yield of activated carbon product based on the carbon feedstock depends on its moisture, its content of organic volatiles, and other properties, as well as on the degree of activation desired. A typical yield based on percentage by mass of dry feedstock is 65% of activated carbon having an Iodine Number (A.S.T.M. Standard Test Method D 4607) up to about 1200 and a Carbon Tetrachloride Activity (A.S.T.M. Standard Test Method D 3467) in the range of about 60 to 70%. With carbons used for decolorization applications, the product typically has a Methylene Blue Decolorizing Power (U.S. Pharmacopeia XXII, Rockville, Md., Jan. 1, 1990) of about 18 or 19. The uniformity of the product is measured by the Coefficient of Variation (CV) of its properties, where the CV is defined as the ratio of the standard deviation, $\sigma$, to the mean, $\mu$, usually expressed as percent, or $$CV = (\sigma/\mu) \times 100\%$$

We have found that the typical CV's of the properties of our activated carbon products are 2.6% or less, which means that the property is within 5% of its average value in at least 95% of the samples measured. Steam utilization is in the range of about 1.0 to 2.0 kg of steam per kg of final product depending on the feedstock and the level of activation desired. Energy usage has been found to be in the range of about 1.50 to 1.75 kWh per kg of product.

The effluent gases that escape from the top of the preheating vessel are passed through a wire gauze and are ignited spontaneously or by a pilot burner. This feature allows the effluent gases to be burned to harmless products without combustion of the carbon itself. The wire gauze may be in the preheating vessel, or it may be separated therefrom by means of a duct that allows combustion of the effluent gases to take place at a remote location.

The nature of our invention will be made clearer by referring to the accompanying drawing in FIG. 1, which is a partly diagrammatic and partly vertical section of the apparatus 10. The carbon feedstock 11 is loaded into feed hopper 12. This loading can be conveniently carried out by means of a conveyor, and it is advantageous, though not essential for the purpose of our invention, to include here a level control system so this feeding can take place automatically. The carbon then moves by gravity from the feed hopper via a feed chute 13 to the preheating vessel 14. The preheating vessel is manufactured from stainless steel and has an electrode 15 attached, by means of a cable lug, to one terminal of a DC power supply 16. It is also possible to use alternating current, but we prefer DC because of the consequent greater ease of control of the operation, especially when large currents are drawn. The preheating vessel preferably contains an inner, centered gas combustion chamber 17, that is supplied with an air inlet 18 and a mesh 19 through which the gases enter from the reactor 20. However, this feature is not essential to our invention. In its absence, the preheating vessel would be provided with gauze cover 21 and the gases would be ignited by a pilot burner 22, or there may be a duct separating the gauze cover from the preheating vessel to allow combustion to take place at a remote location. The reactor 20 preferentially protrudes some distance into the preheating vessel, so that the electric current necessarily passes through a portion of the carbon in the preheating vessel before it enters the reactor. This portion thus serves as an electrical heating zone. The reactor is a cylindrical tube of non-conducting refractory material in which the activation reactions take place. A thermometer 23 that provides a signal to control the electrical power input is provided. The activated carbon passes down from the tubular reactor to the steam heater 24, which is manufactured preferably from stainless steel, and consists of a jacketed vessel having a steam inlet into the jacket and steam orifices 25 leading from the jacket to the radius space. The steam 26 is supplied to the steam heater via hose 27, which can be rubber or other suitable nonconductive tubing, and is controlled by valve 28 and measured by meter 29. The steam heater is connected to the other terminal 30 of the DC power supply. The activated carbon, now cooled by the steam to a temperature below its ignition point, is discharged through knife gate valve 31, which is preferably pneumatically operated by a suitable timer so that it opens for brief periods at set intervals. The discharged carbon enters metering device 32, which limits the amount of material accepted when the knife gate valve opens. The metering device is linked to the knife gate valve by a mechanical linkage 33 or other suitable device so that it operates each time the valve opens, and at no other time. The overall effect of the arrangement of steam heater, timed gate valve, and limiting metering device, is to discharge product that is fully activated but cooled below its ignition temperature, with the result that product yield and energy efficiency are maximized. Gases formed in the reaction vessel and exiting upward through the preheating vessel are burned as described above. The combustion products are collected by hood 34 and discharged through stack 35.

Our invention will be made clearer from the examples that are provided below. These examples are given for illustration only, and are not considered to be limiting. In these examples the procedure described above was used. The properties of the carbon feedstocks are described in Table 1. Table 2 gives examples in which the preheat temperature was in the range of 600° to 700° C. and the reaction temperature range was 800° to 900° C.; the Table shows the steam used per kg of product, and the yields and properties of the products. Product yields are based on the dry weights of the carbon feedstocks.

TABLE 1

Properties of Feedstocks

| Feedstock | Moisture Content, % | Organic Volatiles, % | Particle Size, mm |
|---|---|---|---|
| A. Coconut char | 0–10 | 0–25 | 1–11* |
| B. Wood char | 0–10 | 0–25 | 1–7 |
| C. Bituminous coke | 0–10 | 0–5 | 1–7 |
| D. Bituminous coal | 0–10 | 0–25 | 1–7 |
| E. Anthracite coal | 0–10 | 0–10 | 1–7 |
| F. Spent coconut shell activated carbon | 5–15 | 5–25 | 1–11* |

*Coconut char comes in plates about 3 to 4 mm thick. The length or width can therefore be allowed to be somewhat higher than for particles of other shapes.

TABLE 2

Examples

| Example No. | Feedstock | Steam use kg/kg product | Yield %, dry basis | Product Properties and CV* | |
|---|---|---|---|---|---|
| 1 | A | 1.6 | 70 | I # 1200; | CV = 2.6% |
|   |   |   |   | CTC 65 | 2.5% |
| 2 | B | 1.8 | 65 | I # 1000 | 2.6% |
|   |   |   |   | MB 18 | 2.6% |
| 3 | C | 1.6 | 70 | I # 1200 | 2.3% |
|   |   |   |   | CTC 60 | 2.4% |
| 4 | D | 1.8 | 60 | I # 1200 | 2.5% |
|   |   |   |   | CTC 60 | 2.5% |
| 5 | E | 1.7 | 65 | I # 1200 | 2.5% |
|   |   |   |   | CTC 60 | 2.6% |
| 6 | F | 1.4 | 75 | I # 1150 | 2.5% |

TABLE 2-continued

| | | | Examples | | |
|---|---|---|---|---|---|
| | | | | Product | |
| Example No. | Feedstock | Steam use kg/kg product | Yield %, dry basis | Properties and CV* | |
| | | | | CTC 62 | 2.4% |

*I # = Iodine Number
CTC = Carbon Tetrachloride Activity
MB = Methylene Blue Decolorizing Power
CV = Coefficient of Variation

We claim:

1. In an apparats for carrying out a process for the activation of carbon from carbon feedstocks by electrical resistance heating of the feedstocks in the presence of steam, which comprises a feed hopper from which the carbon feedstock enters via a feed chute into a preheating vessel which includes a gas combustion chamber where gases released from a reaction vessel are burned, the preheating vessel being constructed of stainless steel, a vertical tubular reactor vessel of refractory material, whose top is joined to the bottom of the preheating vessel and whose bottom is joined to a metallic steam-jacketed cylindrical vessel, means for introducing steam into the inside of the metallic steam-jacketed cylindrical vessel, said steam passing upward through the tubular reactor vessel, and the carbon feedstock descending from the preheating vessel and through the tubular reactor vessel, an electrode on the outside of the preheating vessel and another electrode on the outside of the steam-jacketed vessel, the electrodes being connected to a source of electric current, the current passing between the electrodes through the descending carbon feedstock, a flue positioned above the preheating vessel and gas combustion chamber to remove spend gases, temperature measuring means inside the tubular reactor vessel, and means for releasing activated carbon at the end of the process, the improvement wherein the top end of the tubular reactor vessel projects into the preheating vessel.

* * * * *